(12) United States Patent
Verschuren et al.

(10) Patent No.: US 7,613,083 B2
(45) Date of Patent: Nov. 3, 2009

(54) OPTICAL SCANNING DEVICE

(75) Inventors: Coen Adrianus Verschuren, Eindhoven (NL); Ferry Zijp, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 431 days.

(21) Appl. No.: 11/573,786

(22) PCT Filed: Jul. 25, 2005

(86) PCT No.: PCT/IB2005/052485

§ 371 (c)(1),
(2), (4) Date: Feb. 16, 2007

(87) PCT Pub. No.: WO2006/018749

PCT Pub. Date: Feb. 23, 2006

(65) Prior Publication Data

US 2008/0037398 A1  Feb. 14, 2008

(30) Foreign Application Priority Data

Aug. 20, 2004  (EP)  ................................. 04103991

(51) Int. Cl.
*G11B 7/00* (2006.01)
(52) U.S. Cl. .............. 369/44.32; 369/44.25; 369/44.28; 369/53.19
(58) Field of Classification Search ........................ None
See application file for complete search history.

(56) References Cited

U.S. PATENT DOCUMENTS 6,327,110 B1 * 12/2001 Sano et al. ............... 360/77.03
6,404,710 B1   6/2002 Ichimura et al.
2004/0047271 A1 *  3/2004 Mizuno ................. 369/112.24
2004/0100878 A1   5/2004 Chu et al.

FOREIGN PATENT DOCUMENTS

EP    0468613 A2   1/1992

OTHER PUBLICATIONS

T. Ishimoto et al; "High Density Near Field Readout Over 50GB Capacity Using a Solid Immersion Lens With High Refractive Index", Optical Disc Development Div. AV/IT Development Group, Sony Corp., Shinagawa-Ku, Tokyo, Japan, 2001.

* cited by examiner

*Primary Examiner*—Muhammad N. Edun

(57) ABSTRACT

An optical scanning device for scanning a record carrier (22), the record carrier has an outer face (24) and the optical scanning device comprises a radiation source system (2) arranged to generate a radiation beam; an objective system (20) having an exit face (76) and which is arranged between the radiation source system and the record carrier and provides for evanescent coupling of the radiation across a gap between the exit face of the objective system and the outer face of the record carrier; and a radiation detector arrangement for detecting radiation after interaction with the record carrier. The radiation detector arrangement is arranged to produce a tilt error signals ($\alpha$, $\beta$) representing a tilt misalignment between the exit face of the objective system and the outer face of the record carrier. The radiation detector arrangement is arranged to produce the tilt error signal by detecting information in the radiation which is indicative of a variation in efficiency off the evanescent coupling across the exit face.

17 Claims, 6 Drawing Sheets

OPTICAL SCANNING DEVICE

FIELD OF THE INVENTION

The present invention relates to an optical scanning device for scanning record carriers, in particular for scanning record carriers using evanescent coupling of radiation.

BACKGROUND OF THE INVENTION

In a particular type of high-density optical scanning device, a solid immersion lens (SIL) is used to focus a radiation beam to a scanning spot onto an information layer of a record carrier. A certain distance between the exit face of the SIL and the outer face of the record carrier, for example 25 nm, is desirable to allow evanescent coupling of the radiation beam from the SIL to the record carrier. Evanescent coupling may otherwise be referred to as frustrated total internal reflection (FTIR). Such systems are known as near-field systems, deriving their name from the near field formed by the evanescent wave at an exit face of the SIL. An exemplary optical scanning device may use a radiation source which is a blue laser and emits a radiation beam having a wavelength of approximately 405 nm.

During scanning of the record carrier the evanescent coupling between the exit face of the SIL and the outer face of the record carrier should be maintained. An efficiency of this evanescent coupling may vary with a change in the distance of the gap between the exit face and the outer face. With an increase away from a desired gap distance the coupling efficiency will tend to decrease and consequently a quality of the scanning spot will also decrease. If the scanning function involves reading data from the record carrier, for example, this decrease in efficiency will result in a decrease in the quality of the data being read, possibly with the introduction of errors into the data signal.

In non near-field systems, such as compact disc (CD), digital versatile disc (DVD) or Blu-ray, it has been known that tilt misalignment of the record carrier with respect to an optical axis of an objective lens system can adversely affect quality of the scanning spot during writing to and reading from the information layer.

Changes in tilt misalignment may be attributed to an unevenness of a planarity of the record carrier. This may be due to warping of the disc, possibly due to environmental factors such as high temperatures over time or to a low quality manufacturing process of the record carrier. Alternatively, or in addition, tilt misalignment may be caused by poor clamping of the record carrier within the scanning device.

For optical scanning devices which are not of a near-field type, systems are known which allow a tilt misalignment of a record carrier to be measured and corrected for. One conventional system involves using a tilt detector to detect a tilt misalignment of the record carrier and to correct the tilt misalignment based on the extent of the detected tilt misalignment. A different conventional system involves performing an optimisation routine during which data is first written to the record carrier and then read. The quality of the read data is then determined as a function of the tilt misalignment. This allows the tilt misalignment to be corrected for, if necessary.

Use of a conventional tilt detector for detecting tilt misalignment of the record carrier would not provide a sufficient level of accuracy in a near-field system due to the very small tolerances involved, and further would require a high degree of alignment of the objective system with respect to the tilt detector. Exceeding such small tolerances may lead to contact between the SIL and the record carrier, possibly damaging the SIL and/or the record carrier.

Use of an optimisation routine, similar to the known systems, for measuring and estimating tilt misalignment in a near-field system would not be practical.

SUMMARY OF THE INVENTION

It is an object of the invention to provide an optical scanning device for accurately and efficiently scanning record carriers using evanescent coupling by allowing a tilt misalignment between the optical scanning device and a record carrier to be detected and corrected for.

In accordance with the present invention, there is provided an optical scanning device for scanning a record carrier, said record carrier having an outer face, wherein said optical scanning device comprises:

a) a radiation source system arranged to generate radiation;
b) an objective system having an exit face, said objective system being arranged between said radiation source system and said record carrier and providing for evanescent coupling of the radiation across a gap between the exit face of the objective system and the outer face of the record carrier; and
c) a radiation detector arrangement for detecting radiation after interaction with the record carrier, characterised in that the radiation detector arrangement is arranged to produce a tilt error signal representing a tilt misalignment between the exit face of the objective system and the outer face of the record carrier, wherein the radiation detector arrangement is arranged to produce said tilt error signal by detecting information in the radiation which is indicative of a variation in an efficiency of said evanescent coupling across said exit face.

For near-field systems using evanescent coupling to scan record carriers, a deviation from a desired level of tilt alignment has a detrimental effect on the quality and accuracy of data being written and/or read during scanning of the record carrier. Near-field systems employing evanescent coupling have relatively small margins of mechanical tolerance, outside of which the efficiency of the evanescent coupling deteriorates. A deviation from the desired level of tilt alignment exceeding these tolerance margins can cause this deterioration in the efficiency and therefore a detrimental effect on the data quality and accuracy. Moreover, such a deviation will cause the SIL to make contact with the record carrier, possibly causing damage and/or failure of the system.

With a variation in the tilt misalignment, an efficiency of evanescent coupling across the gap varies across the exit face. Consequently, the efficiency of evanescent coupling across the gap at a first exit face area may be different to the efficiency of evanescent coupling across the gap at a second exit face area. By detecting information indicating the variation of the efficiency across the exit face area, a tilt error signal may be produced.

In embodiments of the present invention, the optical scanning device includes a tilt misalignment control system which is arranged to adjust the tilt misalignment in accordance with the tilt error signals.

The tilt error signals can be used to correct the tilt misalignment such that an improved efficiency of evanescent coupling across the total exit face area may be achieved. The record carrier may therefore be scanned with a relatively high quality and level of accuracy. Additionally, the detection and correction of the tilt misalignment does not involve any writing of data on the disc. A tilt misalignment correction procedure is therefore relatively quick and does not necessarily require use of data capacity of the record carrier.

In accordance with embodiments of the present invention, tilt misalignment about both a first tilt axis and a second tilt axis may be detected and adjusted. This is achieved by the additional detection of an efficiency of evanescent coupling across the gap at a third exit face area and at a fourth exit face area.

In some embodiments of the present invention, the radiation generated by the radiation source system is a radiation beam and the device is arranged to introduce defocus into the radiation beam such that the radiation beam is not focused onto the outer face of the record carrier, thereby increasing a diameter of the spot at the exit face.

Preferably in these embodiments, the device is arranged to introduce defocus into the radiation beam such that a cross-sectional area of the radiation beam at the exit face covers at least one quarter of a total area of the exit face.

The spot of this radiation beam at the exit face has an increased diameter, so that a cross sectional area of the radiation beam covers at least one quarter of a total area of the exit face. This increased diameter results in an increase of the area of the first, second, third and fourth exit face areas. This allows a greater amount of information of the efficiency of the evanescent coupling across the exit face to be detected and consequently allows a more accurate adjustment of the tilt misalignment to be performed.

In one embodiment of the present invention, adjustment of the tilt misalignment is performed during a start-up procedure after a record carrier has been installed within the device to produce a corrected tilt alignment, the corrected tilt alignment being maintained, after start-up, and used when scanning the record carrier at different points across said record carrier.

By producing a corrected tilt alignment during the start-up procedure and maintaining the corrected tilt alignment after start-up, the record carrier may be accurately scanned without needing to adjust a tilt misalignment during scanning of the record carrier after the start-up procedure.

In a different embodiment of the present invention the adjustment of the tilt misalignment is performed after a record carrier has been installed within the device, wherein the tilt misalignment is adjusted when scanning the record carrier at different points across said record carrier.

By adjusting the tilt misalignment at different points across the record carrier, it is possible to accurately scan a record carrier having a changeable surface tilt, for example across a radius in the case of the record carrier being a disc. Such record carriers may have been manufactured to a poor level of quality, or may have deteriorated, for example by developing a warp, due to environmental conditions.

Further features and advantages of the invention will become apparent from the following description of preferred embodiments of the invention, given by way of example only, which is made with reference to the accompanying drawings.

DETAILED DESCRIPTION OF THE INVENTION

Figure 1:
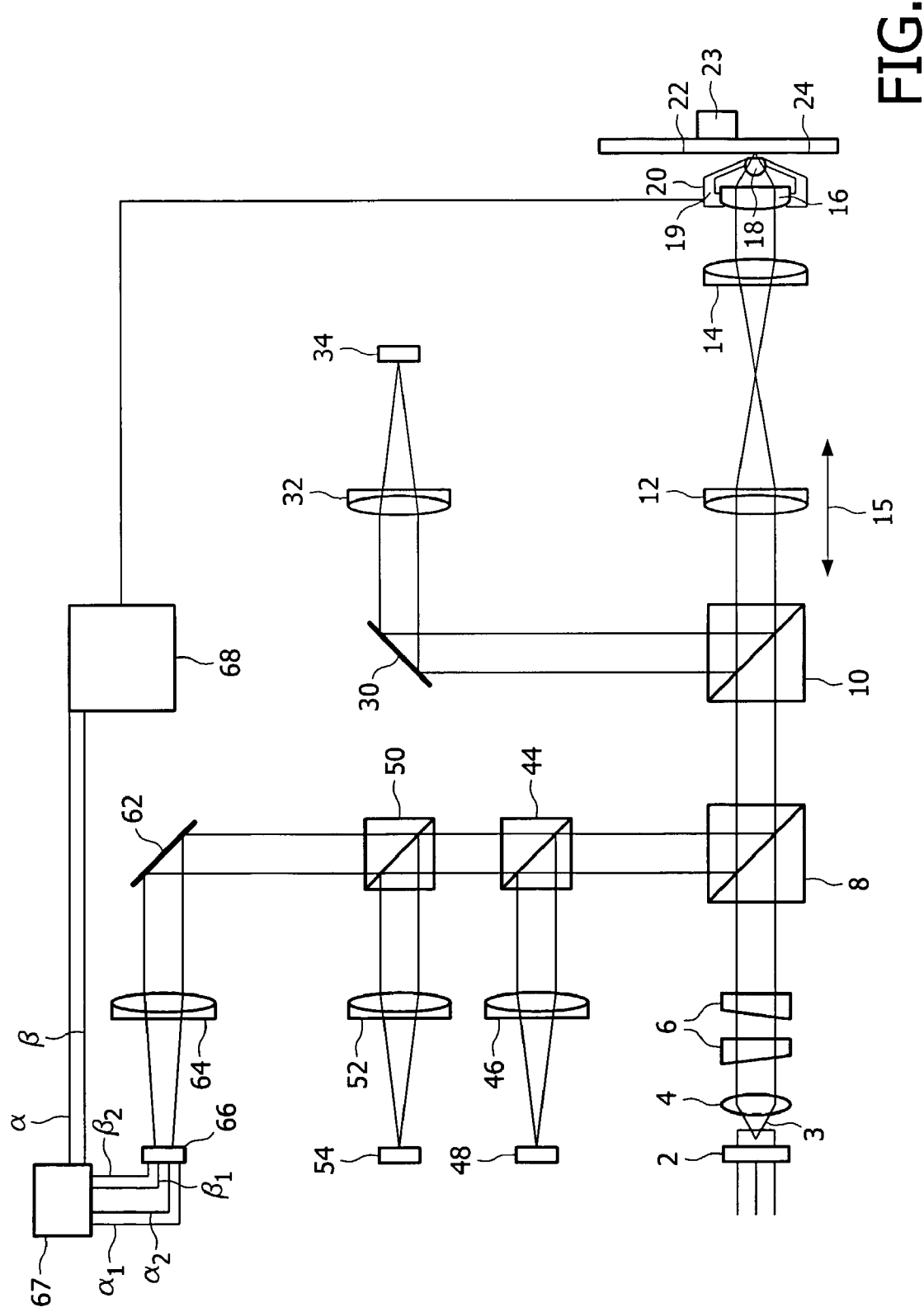
FIG. 1 shows schematically an optical scanning device in accordance with an embodiment of the present invention.

FIG. 1 shows schematically an optical scanning device for scanning a record carrier in accordance with an embodiment of the present invention.

The optical scanning device comprises a radiation source system which is arranged to generate a radiation beam. In this embodiment the radiation source system is a laser 2 and the radiation beam is a laser beam 3 having a predetermined wavelength $\lambda$, for example approximately 405 nm. During both a start-up procedure and a record carrier scanning procedure of the optical scanning device, the radiation beam 3 passing along an optical axis OA of the optical scanning device (not indicated) is collimated by a collimator lens 4 and its cross-sectional intensity distribution shaped by a beam shaper 6. The radiation beam 3 then passes through a non-polarising beam splitter 8, followed by a polarising beam splitter 10 and is then focused by a first focus adjustment lens 12 and a second focus adjustment lens 14. The focusing of the radiation beam 3 is achieved by moving the first focus adjustment lens 12 in a focus adjustment direction 15. An objective system 20 of the optical scanning device comprises an objective lens 16 which introduces a focussing wavefront into the radiation beam 3. The objective system 20 further comprises a solid immersion lens (SIL) 18 which is fixed to the objective lens 16 by a supporting frame 19. The supporting frame 19 ensures that an alignment and a separation distance of the objective lens 16 with the SIL 18 is maintained. The objective system has an exit face which is planar and is an exit face of the SIL 18.

A record carrier 22 to be scanned by the optical scanning device is arranged on a mounting element 23 within the optical scanning device. The mounting element 23 includes a clamping arrangement (not indicated) which ensures that the record carrier 22 is held rigidly and correctly in place on the mounting element 23 during scanning. With the record carrier 22 being rigidly held in place, the mounting element 23 provides for a translation in this embodiment of a rotation of the record carrier 22 in relation to a radiation scanning spot being used to scan data tracks of the record carrier 22. In this embodiment the tracks are rotated in a direction perpendicular to the optical axis OA. The record carrier 22 has an outer face 24 which faces the exit face of the SIL 18. In this embodiment the record carrier 22 is formed of silicon and the outer face 24 is a surface of an information layer of the record carrier 22 through which the radiation beam enters the record carrier 22.

The optical scanning device has an optical axis (not indicated) and the objective system 20 is arranged on the optical axis between the laser 2 and the record carrier 22. The objective system 20 provides for evanescent coupling of the radiation beam 3 across a gap between the exit face of the SIL 18 and the outer face 24 of the record carrier 22. Between the exit face of the SIL 18 and the outer face 24 of the record carrier 22 there is a tilt misalignment.

The maximum information density that can be recorded, for example, on a record carrier scales inversely with the size of the radiation spot that is focused onto a scanning position on the information layer. The minimum spot size is determined by the ratio of two optical parameters: the wavelength $\lambda$ of the radiation and a numerical aperture (NA) of the objective system. The NA of an objective lens such as a SIL is defined as $NA = n \sin(\theta)$, with n the refractive index of the medium in which the radiation beam is focused and $\theta$ the half angle of the focused cone of radiation in that medium. It is evident that the upper limit for the NA of objective lenses that focuses in air or through a plane parallel plate such as a planar record carrier, is unity. The NA of a lens can exceed unity if the radiation beam is focused in a high index medium and passes to an object without refraction at the medium air-medium interface between the lens and the object. This can be achieved, for example by focusing in the centre of an exit face of a SIL having a hemispherical shape, the SIL being in close proximity to the object. In this case the effective NA is $NA_{eff} = n\, NA_0$ with n the refractive index of the hemispherical lens and $NA_0$ the NA in air of the focusing lens. A possibility to further increase the NA is the use of a SIL having a super-hemispherical shape in which the super-hemispherical SIL refracts the radiation beam towards the optical axis and focuses it below the centre of the super-hemisphere. In the latter case the effective NA is $NA_{eff} = n^2 NA_0$. It is important to note that an effective $NA_{eff}$ larger than unity is only present within an extremely short distance (also called the near-field) from the exit face of the SIL, where an evanescent wave exists. In this embodiment the exit face is the last refractive surface of the objective system before the radiation impinges on the object. The short distance is typically less than one tenth of the wavelength $\lambda$ of the radiation beam.

When the object is an optical record carrier and an outer face of the optical record carrier is arranged within this short distance, radiation is transmitted from the SIL to the record carrier by evanescent coupling. This means that during writing or read-out of a record carrier, the distance between the SIL and record carrier, also called the gap size, should be smaller than a few tens of nanometers, for example, about 25 nm for a system using a blue laser radiation source to generate a radiation beam having a wavelength $\lambda$ equal to approximately 405 nm and an NA of the objective system of 1.9.

The optical scanning device has a first detection path and a second detection path which are both arranged in a path of the radiation beam following a reflection by the record carrier 22.

In the first detection path of the optical scanning device there is arranged a folding mirror 30 and a condenser lens 32 for focusing a detection radiation beam onto a first polarised radiation detector 34.

Following a reflection of the radiation beam by the record carrier 22, reflected radiation passes along the optical axis OA and through the objective system 20, the second and first focus adjustment lenses 14, 12 and the polarising beam splitter and then along the first detection path via the folding mirror 30 and is focused onto the first polarised radiation detector 34 by the condenser lens 32.

In the second, different, detection path of the optical scanning device there is arranged a non-polarising beam splitter 44, a condenser lens 46 for focusing a detection radiation beam onto a second polarised radiation detector 48, a non-polarising beam splitter 50, a condenser lens 52 for focusing a detection radiation beam onto a third polarised radiation detector, in this embodiment a push-pull detector 54, a folding mirror 62 and a condenser objective lens 64 for ensuring that a detection radiation beam spot which has a predetermined amount of defocus falls onto a detector arrangement for detecting radiation from the radiation beam after interaction with the record carrier. The radiation detector arrangement in this embodiment includes a quadrant detector 66 and is arranged to produce tilt error signals which represent the tilt misalignment between the exit face of the SIL 18 and the outer face 24 of the record carrier 22. The tilt error signals are produced by a detection of information, in a detection radiation beam, of a distribution across the exit face of an intensity of the reflected radiation beam. This distribution of intensity is indicative of a variation in efficiency of the evanescent coupling across the exit face. Detection quadrant areas of the quadrant detector 66 are individually and electrically connected to signal processing circuitry 67 of the radiation detector arrangement. The signal processing circuitry 67 is electrically connected to the control unit 68 of a tilt misalignment control system which is arranged to vary the tilt misalignment in accordance with the tilt error signals. The tilt misalignment control system further includes a tilt misalignment variation system (not indicated) which in this embodiment is an actuator (not indicated) which is electrically connected to the control unit 68. The control unit 68 is arranged to control the actuator which is arranged to adjust a tilt of the objective system 20, thereby varying the tilt misalignment. Following the reflection of the radiation beam by the record carrier 22 the reflected radiation, having reached the polarising beam splitter 10 passes via the non-polarising beam splitter 8 to the second detection path. Reflected radiation passes via the non-polarising beam splitter 44 and then both via the condenser lens 46 to the second polarised radiation detector 48 and via the non-polarising beam splitter 50 and the condenser lens 52 to the push-pull detector 54. Reflected radiation being detected by the quadrant detector 66 is explained below.

During a scanning function of the optical scanning device, such as a reading or writing of data, the device uses two polarised radiation detectors. The second polarised radiation detector 48 is used for detection of radiation that is polarized parallel to the radiation beam that is focused on the record carrier 22 and contains information read from the information layer. The first polarised radiation detector 34 detects radiation that is polarized perpendicular to a direction of polarization of the radiation beam that is focused on the record carrier 22.

To allow control of the distance of the gap a suitable error signal is required. As detailed by Sony and referenced herein (T. Ishimoto et al., Proceedings of Optical Data Storage 2001 in Santa Fe), a good gap signal (GS) is obtained from reflected radiation with a polarisation state perpendicular to that of the radiation beam focused on the record carrier. A significant fraction of radiation of the radiation beam becomes elliptically polarised after reflection at the exit face and the outer faces. This creates the well-known Maltese cross when the reflected radiation is observed through a polariser. The GS is generated by integrating all the light of this Maltese cross using polarising optics and a single photodetector. The GS is derived from a low-frequency, for example DC to approximately 30 kHz, part of the detection radiation beam focused on the first detector 34.

In the scanning function, for example data recording, very short, high-power laser pulses are emitted by the laser 2. These pulses dynamically change the (average) laser power, leading to corresponding changes in the GS corresponding to a size of the gap between the exit face and the outer face 24, and, due to a gap servo system, also in the gap for the optical scanning device. For example, if the laser power increases suddenly, the GS will also increase. The gap servo system, however, will reduce the air gap size in order to arrive at a desired gap size again. A similar effect occurs during data reading when the laser power changes, e.g. due to temperature drift.

The push-pull detector 54 detects from a detection radiation beam a radial tracking error of the radiation beam spot on a track of the information layer of the record carrier 22. The push-pull detector 54 detects radiation that is polarized parallel to a direction of polarization of the radiation beam that is focused on the record carrier 22

Figure 2:
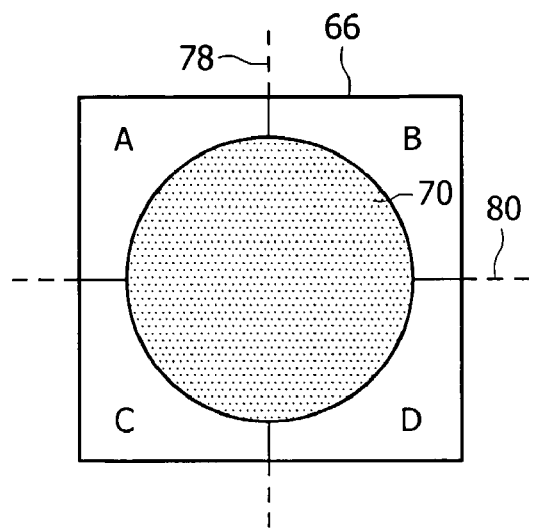
FIG. 2 shows a detector arrangement for detecting tilt error signals in accordance with an embodiment of the present invention.
Figure 3:
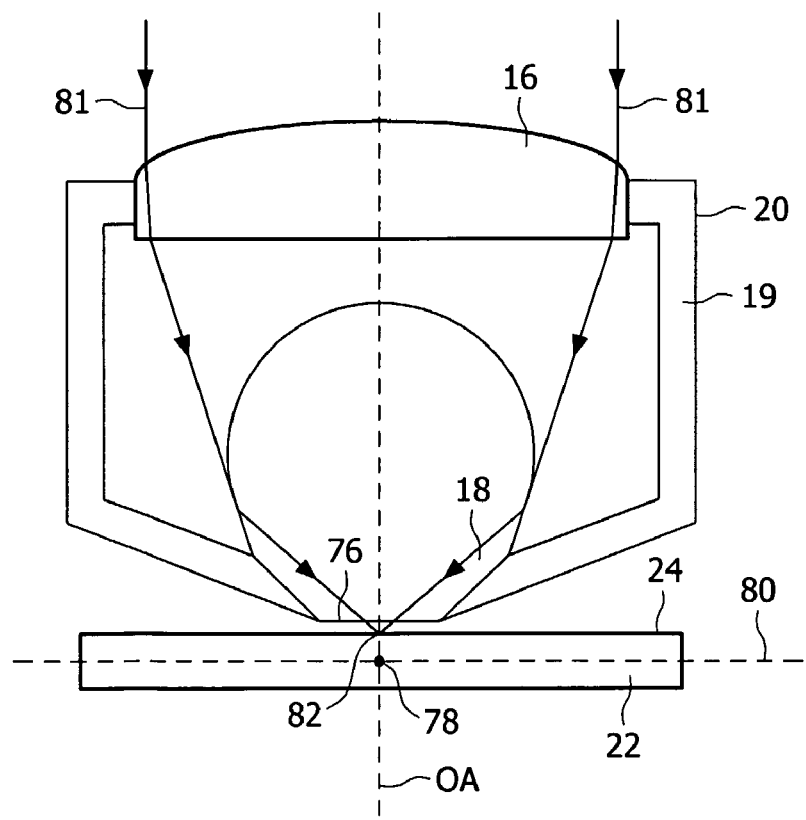
FIG. 3 shows schematically an objective system and a record carrier having a desired tilt alignment and in accordance with an embodiment of the present invention.

Referring now to FIGS. 2 and 3, the quadrant detector 66 is shown having a first, second, third and fourth detection quadrant area A, B, C, D respectively. During a tilt misalignment detection procedure the detection radiation beam spot 70 falls on the quadrant detector 66. The detection radiation beam spot 70 has a predetermined level of defocus, as explained below.

The tilt misalignment includes a tilt misalignment about a first tilt axis 78 which is perpendicular the optical axis OA. The tilt misalignment further includes a tilt misalignment about a second tilt axis 80 which is substantially perpendicular the optical axis OA and the first tilt axis 78.

Figure 4:
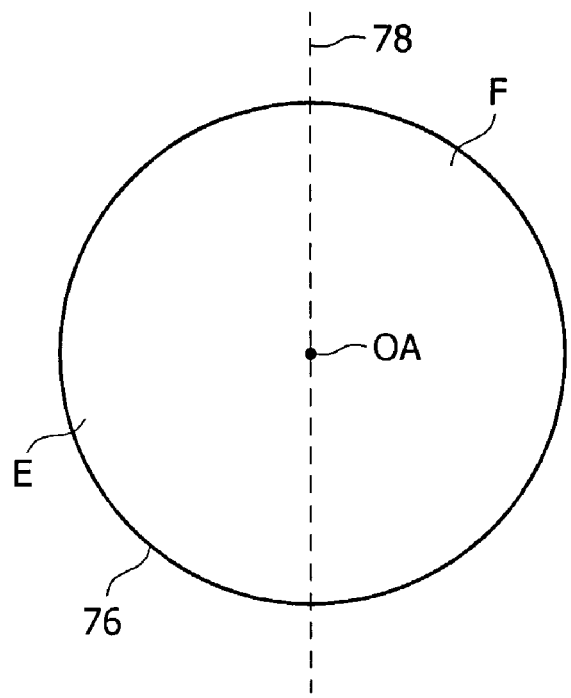
FIGS. 4 and 5 show an exit face of an objective system in accordance with an embodiment of the present invention.
Figure 5:
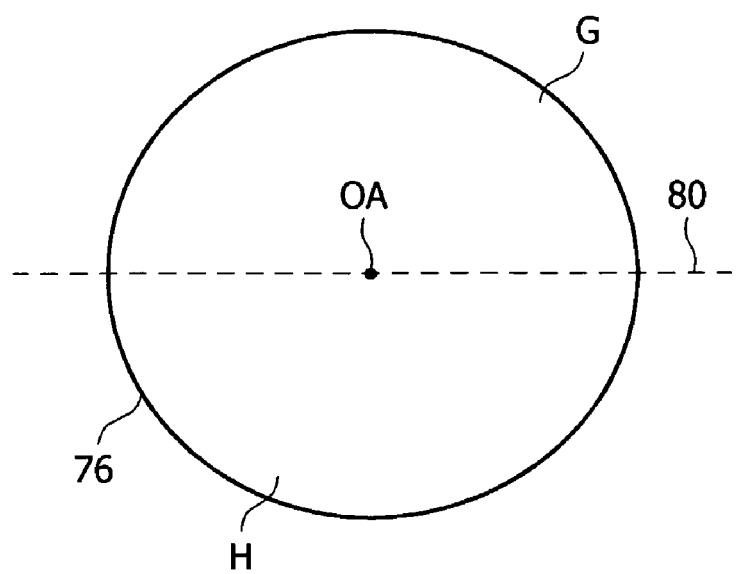

The quadrant detector 66 includes a first detection area made up of the second and the fourth detection quadrant areas B, D, a second detection area made up of the first and the third quadrant areas A, C, a third detection area made up of the first and the second quadrant areas A, B, and a fourth detection area made up of the third and fourth quadrant areas C, D. Referring to FIGS. 4 and 5 the exit face 76 (illustrated in FIGS. 4 and 5 and viewed in a direction along the optical axis OA from the record carrier 22 to the objective system 20) includes a first exit face area E and a second exit face area F which are mutually displaced to opposite sides of the first tilt axis 78. The exit face further includes a third exit face area G and a fourth exit face area H which are mutually displaced to opposite sides of the second tilt axis 80.

During the tilt misalignment detection procedure the first, second, third and fourth detection areas A, B, C, D are each arranged to detect information in the detection radiation beam spot 70 which is indicative of an efficiency of the evanescent coupling between the exit face 76 and the outer face 24. The signal processing circuitry 67 is arranged to produce a first detector signal $\alpha_1$ which represents the efficiency of the evanescent coupling across the first exit face area E. Similarly, the signal processing circuitry 67 is arranged to produce a second detector signal $\alpha_2$ which represents the efficiency of the evanescent coupling across the second exit face area F, to produce a third detector signal $\beta_1$ which represents the efficiency of the evanescent coupling across the third exit face area G and to produce a fourth detector signal $\beta_2$ which represents the efficiency of the evanescent coupling across the fourth exit face area H.

The first detector signal $\alpha_1$ is a sum of a second quadrant area signal produced by the second quadrant area and a fourth quadrant area signal produced by the fourth quadrant area. The second detector signal $\alpha_2$ is a sum of a first quadrant area signal produced by the first quadrant area and a third quadrant area signal produced by the third quadrant area. The third detector signal $\beta_1$ is a sum of a first quadrant area signal produced by the first quadrant area and a second quadrant area signal produced by the second quadrant area. The fourth detector signal $\beta_2$ is a sum of a third quadrant area signal produced by the third quadrant area and a fourth quadrant area signal produced by the fourth quadrant area.

For each detection area, the efficiency of the evanescent coupling across an exit face area, for example the first exit face area E, is detected by detecting an intensity of radiation of the detection radiation beam spot 70 falling on the corresponding detection area, for example the first detection area. A relatively high intensity of radiation falling on the detection area indicates a relatively low efficiency of evanescent coupling across the corresponding exit face area. In contrast, a relatively low intensity of radiation falling on the detection area indicates a relatively high efficiency of evanescent coupling across the corresponding exit face area.

The signal processing circuitry 67 is arranged to produce a first tilt error signal $\alpha$ according to the relationships of equations 1 and 2:

$$\alpha = \frac{\alpha_1 - \alpha_2}{\alpha_1 + \alpha_2} \quad (1)$$

$$\alpha = \frac{(B+D) - (A+C)}{(B+D) + (A+C)} \quad (2)$$

Additionally, the signal processing circuitry 67 is arranged to produce a second tilt error signal $\beta$ according to the relationships of equations 3 and 4:

$$\beta = \frac{\beta_1 - \beta_2}{\beta_1 + \beta_2} \quad (3)$$

$$\beta = \frac{(A+B) - (C+D)}{(A+B) + (C+D)} \quad (4)$$

The control unit 68 is arranged to vary the tilt misalignment about the first tilt axis 78 in accordance with the first tilt error signal $\alpha$ and to vary the tilt misalignment about the second tilt axis 80 in accordance with the second tilt error signal $\beta$.

As shown in FIG. 2, a cross-sectional area of the detection radiation beam spot 70 has a uniform radiation intensity which is characteristic of the desired tilt misalignment. Consequently the first, second, third and fourth detector signals $\alpha_1$, $\alpha_2$, $\beta_1$, $\beta_2$ are approximately equal and consequently the first and second tilt error signals $\alpha$, $\beta$ are such that the control unit 68 does not need to vary the tilt misalignment.

The SIL 18 of the objective system 20 in the embodiment shown in FIG. 3 has a conical super-hemispherical shape with the exit face 76 facing the outer face 24. A diameter of the exit face 76 is approximately 40 µm and the NA of the SIL is 1.9. A desired tilt alignment is illustrated in FIG. 2 where the exit face 76 is substantially parallel the outer face 24 and both the exit face 76 and the outer face 24 are substantially perpendicular the optical axis OA.

FIG. 3 shows the objective system 20 and the record carrier 22 having a desired tilt alignment such that during a scanning function of the optical scanning device, for example a data writing procedure, rays 81 of a scanning radiation beam are focused to a spot 82 on the information layer 24 of the record carrier 22. This is achieved when a distance across the gap between the outer face 24 and the exit face 76 is less than approximately one tenth of the wavelength λ of the radiation beam. This ensures that an efficient evanescent coupling across the gap for a total area of the exit face 76 is achieved. In the example of data writing, the focused spot will allow data to be written accurately onto the information layer 24. When the desired tilt alignment is not present, the quality of the spot 82 on the information layer 24 of the record carrier is affected.

Figure 6:
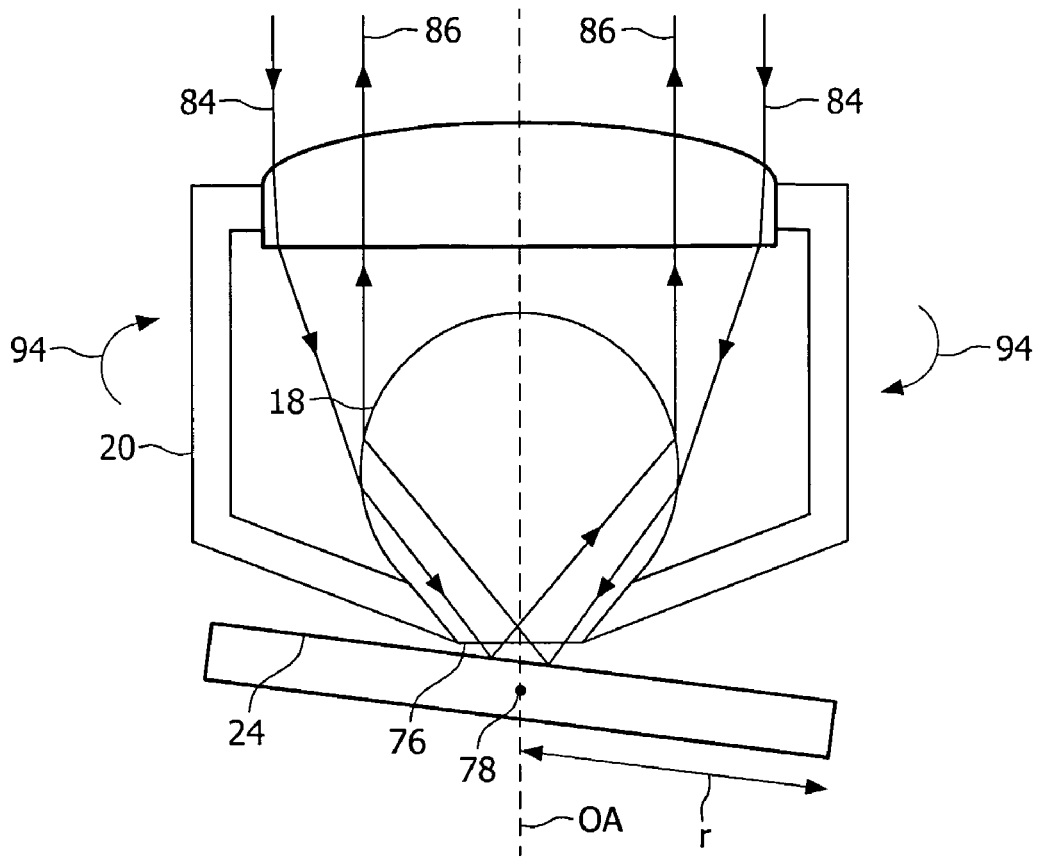
FIG. 6 shows schematically an objective system and a record carrier having a tilt misalignment about a first tilt axis in accordance with an embodiment of the present invention.
Figure 7:
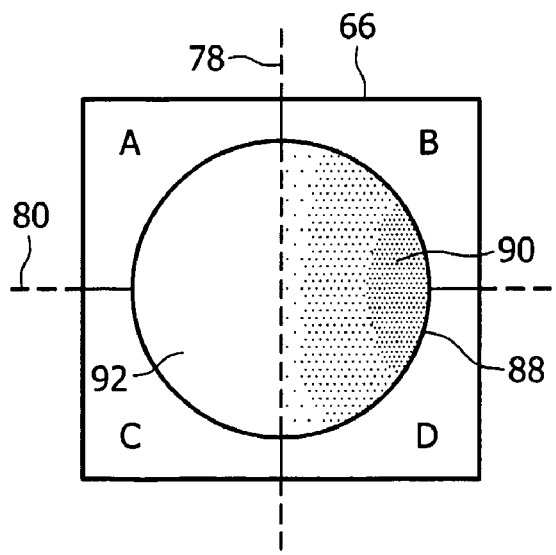
FIG. 7 shows a detector arrangement for detecting information of a radiation beam spot in accordance with an embodiment of the present invention.
Figure 8:
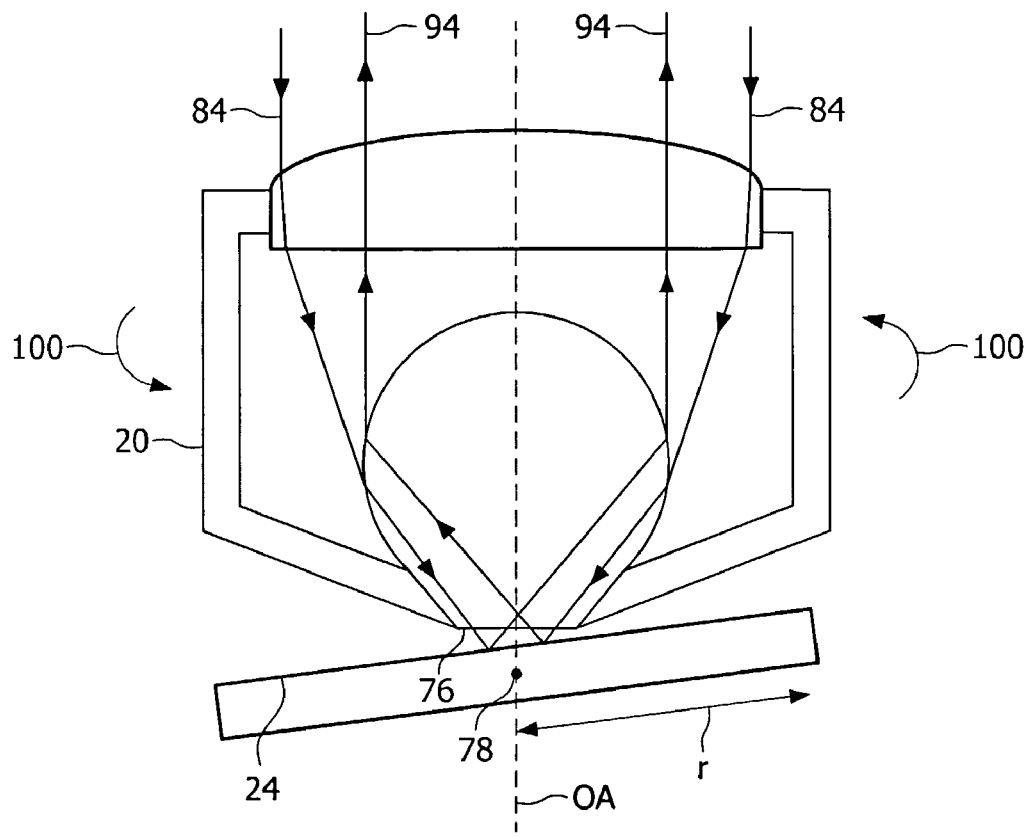
FIG. 8 shows schematically an objective system and a record carrier having a different tilt misalignment about the first tilt axis in accordance with an embodiment of the present invention.
Figure 9:
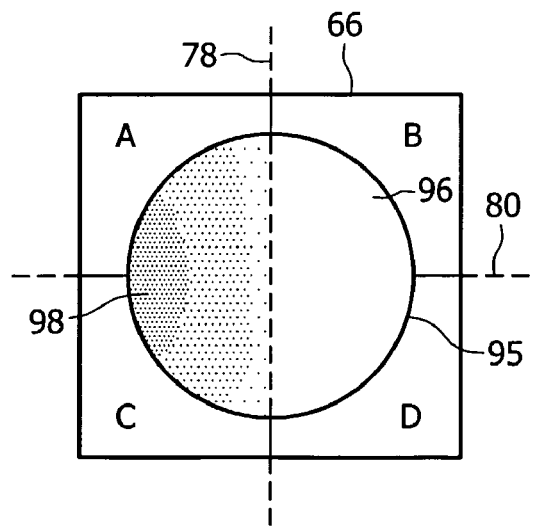
FIG. 9 shows a detector arrangement for detecting information of a radiation beam spot in accordance with an embodiment of the present invention.

FIGS. 6, 7, 8 and 9 shows cases where the system has a deviation from the desired tilt alignment. In this case the tilt misalignment is about the first tilt axis 78. FIGS. 6 and 7 show the situation where the tilt misalignment is in one direction about the first tilt axis 78. FIGS. 8 and 9 show the contrasting situation where the tilt misalignment is in an opposite direction to the one direction about the first tilt axis 78. With a non-desired tilt misalignment, the exit face 76 and the outer face 24 are not substantially parallel to each other and the outer face 24 and/or the exit face 76 are not substantially perpendicular the optical axis OA.

During the tilt misalignment correction procedure the optical scanning device is arranged to introduce defocus into the radiation beam 3 such that the radiation beam 3 is not focused within the record carrier 22, thereby increasing a diameter of a spot of the radiation beam 3 at the exit face 76. The defocus is introduced into the radiation beam 3 such that a cross-sectional area of the radiation beam 3 at the exit face 76 covers at least one quarter of a total area of the exit face 76, preferably at least one half of the total area and more preferably approximately all of a total area of the exit face 76. In this embodiment the diameter of the defocused spot at the exit face 76 is at least 10 µm, preferably approximately 20 µm. The defocus is introduced by appropriately moving the first focus adjustment lens 12 in the focus adjustment direction 15.

Referring to FIGS. 6 and 7 and during the tilt misalignment detection procedure rays 84 of the radiation beam 3 pass through the objective system 20 and strike the outer face 24 of the record carrier 22. As can be seen from FIG. 4, the gap between the exit face 76 and the outer face 24 on the left-hand side of the optical axis OA, therefore corresponding with the first exit face area E, is relatively smaller than the gap on the right-hand side of the optical axis OA which corresponds with the second exit face area F. The record carrier 22 in this embodiment has a radius r which lies in a plane of the outer face 24 and extends outwards from a centre point of the record carrier 24. The centre-point is coincident with an intersection between the first tilt axis 78 and the second tilt axis 80. The gap gets smaller in size across the first exit face area E in an outwards direction from the centre point along the radius r. The gap gets larger in size across the second exit face area F in an outwards direction from the centre point along the radius r. Upon striking the outer face 24, the rays 84 are partially transmitted by the outer face 24 and subsequently absorbed and reflected within the record carrier 22 and partially reflected by the outer face 24. Additionally, the rays 84 may be totally internally reflected on the exit face 76 of the SIL 18.

Proportions of the rays 84 which are reflected and absorbed depend on the size of the gap. When the gap is larger than desired, the efficiency of evanescent coupling across the gap is relatively low and fewer of the rays 84 are transmitted across the gap to the outer face 24. This leads to a greater proportion of the rays 84 being totally internally reflected by the inside surface of the exit face 76. A portion of those rays 84 which reach the outer face 24 is reflected by the outer face 24 and a portion is transmitted by the outer face 24. The rays may be absorbed by a material from which the record carrier 22 and/or the outer face 24 is formed, or by a destructive interference of the rays upon interaction with structural features of the entrance layer 24 and/or information layer such as pits and embossments.

With the gap across the second exit face area F being larger than desired, as is shown in FIG. 6, the gap across the first exit face area E is smaller than desired. In this situation, the evanescent coupling is of a relatively high efficiency across the first exit face area E and a greater proportion of the rays 84 across the first exit face area E are transmitted to the outer face 24. As a consequence, a greater proportion of the rays 84 across the first exit face area E across the first exit face area E are absorbed by the outer face 24 and within the record carrier 22. Less of the rays 84 are therefore reflected by the outer face 24 and the inside surface of the exit face 76.

Reflection of the rays 84 by the exit face 76 of the SIL 18 of the objective system 20 and by the outer face 24, introduces information in the radiation 3 reflected by the objective system which is indicative of the efficiency of the evanescent coupling of the radiation between the objective system and the record carrier 3. The reflected rays 86 constitute a detection radiation beam which passes along the optical axis OA through the second and first focus adjustment lenses 14, 12, the polarising beam splitter 10, the non-polarising beam splitter 8, and then passes along the second detection path via the non-polarising beam splitter 44, the non-polarising beam splitter 50, the further non-polarising beam splitter 56, the folding mirror 62 and the objective lens 64 to the quadrant detector 66.

FIG. 7 shows a detection radiation beam spot 88 falling on the quadrant detector 66 in accordance with the tilt misalignment in the one direction about the first tilt axis 78. Across the first detection area 90 a relatively low overall intensity of the detection radiation beam is detected which corresponds to a low proportion of the rays 84 across the area of the first exit face area E being reflected by both the inside surface of the exit face 76 and the outer face 24. Across the second detection area 92 a relatively high overall intensity of the detection radiation beam is detected which corresponds to a relatively high proportion of the rays 84 across the second exit face area F being reflected by both the inside surface of the exit face 76 and the outer face 24.

By detecting a relatively low overall intensity of radiation across the first detection area 90 a first detector signal $\alpha_1$ is produced which has a relatively low magnitude. By detecting a relatively high overall intensity of radiation across the second detection area 92 a second detector signal $\alpha_2$ is produced which has a relatively high magnitude. The signal processing circuitry 67 produces the first tilt error signal α in accordance with equations 1 and 2. The control unit 68 receives this first tilt error signal α and controls the actuator to vary the tilt of the objective system 20 in a tilt misalignment correction direction 94, as shown in FIG. 6, so as to achieve the desired tilt misalignment, as described previously, in which the exit face 76 and the outer face 24 are substantially parallel each other. During variation of the tilt of the objective system 20, the magnitude of the first and the second detector signals $\alpha_1$, $\alpha_2$ varies as the intensity of radiation being detected by both the first detector area 90 and the second detector area 92 varies. As a result, the first tilt error signal α varies and the control unit 68 monitors this variation. Once the control unit 68 identifies that the first tilt error signal α is at least approximately the same as a first tilt error signal α which is characteristic of the desired tilt misalignment, the control unit 68 stops the actuator's variation of the tilt of the objective system 20. At this point the tilt misalignment about the first tilt axis 80 is corrected for.

Referring to FIG. 8 the tilt misalignment is in the opposite direction about the first tilt axis 78. During the tilt misalignment detection procedure rays 84 of the radiation beam 3 pass through the objective system 20 and strike the outer face 24 of the record carrier 22. As can be seen from FIG. 6, the gap between the exit face 76 and the outer face 24 on the left-hand side of the optical axis OA, therefore corresponding with the first exit face area E, is relatively larger than the gap on the right-hand side of the optical axis OA which corresponds with the second exit face area F. The gap gets larger in size across the first exit face area E in an outwards direction from the centre point along the radius r. The gap gets smaller in size across the second exit face area F in an outwards direction from the centre point along the radius r.

With the gap across the second exit face area F being smaller than desired, the gap across the first exit face area E is larger than desired. In this situation, the evanescent coupling is of a relatively high efficiency across the second exit face area F and a greater proportion of the rays 84 across the second exit face area F are transmitted to the outer face 24. As a consequence, a greater proportion of the rays 84 across the second exit face area F are absorbed by the outer face 24 and within the record carrier 22. Fewer of the rays 84 across the second exit face area F are therefore reflected by the outer face 24 and the inside surface of the exit face 76.

FIG. 9 shows a detection radiation beam spot 95 of the detection radiation beam, comprising differently reflected rays 94 for the tilt misalignment in the opposite direction about the first tilt axis 78, falling on the quadrant detector 66. Across the first detection area 96 a relatively low overall intensity of the detection radiation beam is detected which corresponds to a relatively high proportion of the rays 84 across the area of the first exit face area E being reflected by both the inside surface of the exit face 76 and the outer face 24. Across the second detection area 98 a relatively low overall intensity of the detection radiation beam is detected which corresponds to a relatively low proportion of the rays 84 across the area of the second exit face area F being reflected by both the inside surface of the exit face 76 and the outer face 24.

By detecting a relatively high overall intensity of radiation across the first detection area 96 a first detector signal $\alpha_1$ is produced which has a relatively high magnitude. By detecting a relatively low overall intensity of radiation across the second detection area 98 a second detector signal $\alpha_2$ is produced which has a relatively low magnitude. The signal processing circuitry 67 produces the first tilt error signal $\alpha$ in accordance with equation 1. The control unit 68 receives this first tilt error signal $\alpha$ and controls the actuator to vary the tilt of the objective system 20 in a tilt misalignment correction direction 100, as shown in FIG. 6, so as to achieve the desired tilt misalignment. This involves, as described previously, the control unit 68 identifying when the first tilt error signal $\alpha$ is the same as a first tilt error signal $\alpha$ which is characteristic of the desired tilt alignment and stopping the actuator's variation of the tilt of the objective system 20 at this point.

In addition to detecting and correcting a tilt misalignment about the first axis 78, the tilt misalignment correction procedure also includes detecting and correcting a tilt misalignment about the second tilt axis 80, in a similar manner to detecting and correcting the tilt misalignment about the first tilt axis 78 as previously described.

The signal processing circuitry 67 produces the second tilt error signal $\beta$, in accordance with equations 3 and 4 which is dependent on the magnitude of the third and fourth detector signals $\beta_1$ and $\beta_2$. The magnitude of the third and fourth detector signals $\beta_1$ and $\beta_2$ depends on an intensity of radiation of the reflected rays of the detection radiation beam falling on the third and fourth detection areas, respectively. As described previously, the intensity of radiation falling on the detection areas depends on an efficiency of evanescent coupling across the gap. The actuator varies the tilt of the objective system 20 in a tilt misalignment correction direction about the second tilt axis 80 until the second tilt error signal $\beta$ is the same as a second tilt error signal $\beta$ which is characteristic of the desired tilt misalignment.

Following the tilt misalignment correction procedure, the optical scanning device performs a scanning function, for example writing of data to or reading of data from the record carrier 22. In order to do so, the defocus of the radiation beam 3 is removed by moving the first focus adjustment lens 12 in the focus adjustment direction 15. This ensures that the radiation beam 3 is focused to a spot on the information layer of the record carrier.

Figure 10:
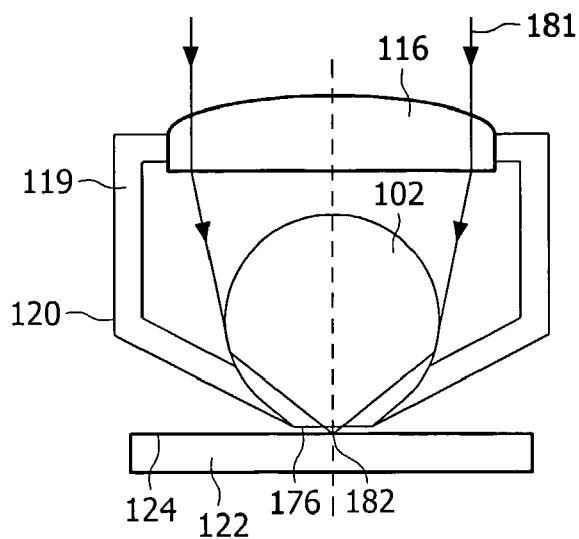
FIG. 10 shows schematically an objective system and a record carrier in accordance with a different embodiment of the present invention.
Figure 11:
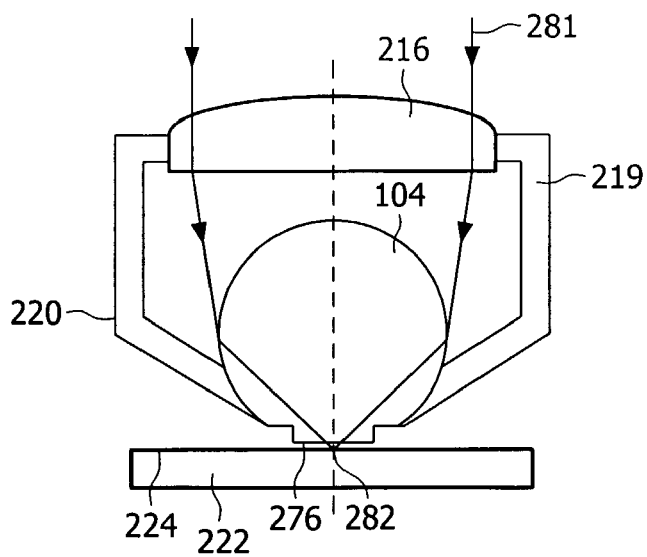
FIG. 11 shows schematically an objective system and a record carrier in accordance with a different embodiment of the present invention.
Figure 12:
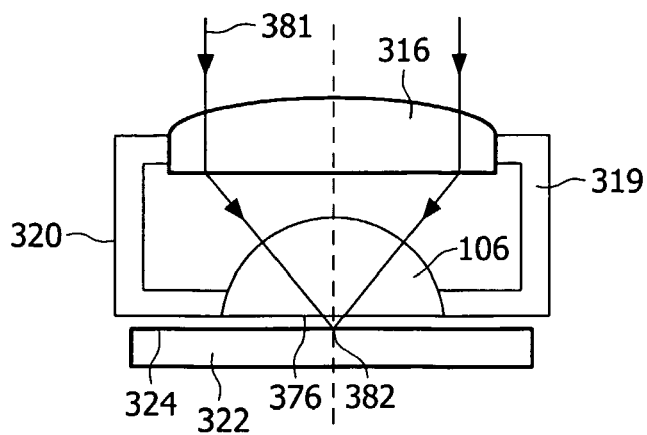
FIG. 12 shows schematically an objective system and a record carrier in accordance with a different embodiment of the present invention.

In further embodiments of the present invention, the objective system comprises a different SIL. FIGS. 10, 11 and 12 each show a radiation beam being focused to a spot onto the outer face of a record carrier by an objective systems with a different SIL according to the further embodiments. Features and elements illustrated in these figures are similar to features and elements described previously. Similar descriptions of these features and elements should be taken to apply here also and the same reference numerals are used herein, incremented by 100 for FIG. 10, incremented by 200 for FIG. 11 and incremented by 300 for FIG. 12.

FIG. 10 shows an embodiment of the present invention where the objective system 120 includes a SIL 102 which has a non-conical super-hemispherical shape.

FIG. 11 shows an embodiment of the present invention where the objective system 220 includes a SIL 104 which has a mesa super-hemispherical shape where the exit face 276 is a protrusion of the SIL 104.

FIG. 12 shows an embodiment of the present invention where the objective system 320 includes a SIL 106 which has a hemispherical shape.

The above embodiments are to be understood as illustrative examples of the invention. Further embodiments of the invention are envisaged.

In the described embodiment of the present invention as illustrated using FIGS. 1 to 8, the tilt of the objective system is adjusted to achieve a desired tilt alignment. A maximum range of tilt variation of the objective system with respect to the optical axis OA is approximately 0.07° to 0.28° with the objective system having such a tilt within this range, the gap size is approximately one tenth of the wavelength $\lambda$ of the radiation beam. The tilt angles within this range are lower than a maximum possible tilt angle of the objective system with respect to the optical axis OA of approximately 0.5°. In a further embodiment of the present invention the tilt is alternatively varied by adjusting a tilt of the record carrier. This is achieved by varying the tilt of the mounting element holding the record carrier in accordance with the first and second tilt error signals. In this case the actuator is arranged to vary the tilt of the record carrier in this manner. It is further envisaged that the tilt misalignment is corrected by adjusting both the tilt of the objective system and the tilt of the record carrier simultaneously.

In the described embodiment of the present invention the tilt misalignment correction procedure, including variation of the tilt misalignment, is performed during a start-up procedure of the optical scanning device. The tilt misalignment correction is performed after the record carrier having the radius r has been installed within the device. Once the tilt misalignment has been corrected, i.e. once the exit face and the outer face have the desired level of tilt alignment, the corrected tilt alignment is maintained after the start-up procedure during the scanning function.

In a different envisaged embodiment of the present invention, the tilt misalignment is measured at different points along the radius of the record carrier when the record carrier has been installed within the optical scanning device. Prior to performing the scanning function of the optical scanning device, the tilt misalignment is first corrected to achieve a desired level of tilt alignment at a first point on the radius. During the scanning function along the radius, the tilt misalignment is corrected at each of the different points along the radius such that the desired level of tilt alignment is achieved at each of the points along the radius.

In the described embodiment of the present invention, the record carrier has an information layer and the outer face is a surface of this information layer. It is alternatively envisaged that the record carrier has an information layer and a cover layer. One surface of the cover layer is the outer face whereas the information layer is arranged on the other surface of the cover layer. In this alternative embodiment the optical scanning device is adapted so that during the scanning function the radiation beam is focused through the cover layer to a spot on the information layer. One such adaptation is a change in a thickness of the SIL along the optical axis.

The described embodiment of the present invention details the radiation detector arrangement as including a quadrant detector. Each detection quadrant area is a photodiode. It is alternatively envisaged that the detector arrangement includes a detector which is similar to a camera detector, for example a Charged Coupled Device (CCD).

The record carrier as described in the detailed embodiment of the present invention is formed of silicon. It is further envisaged that the record carrier is of a different construction and is formed of a plurality of layers including, for example for a read-only type disc, a polycarbonate layer and a metallic layer or a stack of dielectric layers. For a recordable type disc the plurality of layers is envisaged to include a polycarbonate layer and a layer formed of a material with a changeable phase or a magneto optical layer or a dye layer. The record carrier may comprise more than one information layer e.g. two, three, four or more.

The described embodiment of the present invention details the radiation beam having a certain wavelength. It is envisaged that the radiation beam has a different certain wavelength and the optical scanning device and the record carrier are suitably arranged to operate at this different certain wavelength. The record carrier in the described embodiment of the invention is an optical record carrier, however it is envisaged in further embodiments that the optical scanning device is adapted to scan different types of record carrier including for example a disc employing hybrid recording such as heat assisted magnetic recording (HAMR) or a disc of a computer hard disc drive (HDD).

In the described embodiment of the present invention, a single radiation beam is used for both the tilt misalignment correction procedure and the scanning function. It is alternatively envisaged that different radiation beams, generated by different radiation sources may be used for each of the tilt misalignment correction procedure and the scanning function. The different radiation sources may be used to generate radiation for scanning a different type of record carrier to that of the described embodiment.

In the described embodiment of the present invention, the first tilt axis is perpendicular the optical axis and the second tilt axis is perpendicular both the optical axis and the first tilt axis. In further embodiments of the present invention the first and the second tilt axis are envisaged to have a different spatial arrangement with respect to each other and to the optical axis OA.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An optical scanning device for scanning a record carrier (22), said record carrier having an outer face (24), wherein said optical scanning device comprises:

a) a radiation source system (2) arranged to generate radiation;

b) an objective system (20) having an exit face (76), said objective system being arranged between said radiation source system and said record carrier and providing for evanescent coupling of the radiation across a gap between the exit face of the objective system and the outer face of the record carrier; and c) a radiation detector arrangement for detecting radiation after interaction with the record carrier, characterised in that the radiation detector arrangement is arranged to produce a tilt error signal ($\alpha$, $\beta$) representing a tilt misalignment beteen the exit face of the objective system and the outer face of the record carrier, wherein the radiation detector arrangement is arranged to produce said tilt error signal by detecting information in the radiation which is indicative of a variation in an efficiency of said evanescent coupling across said exit face.

2. An optical scanning device according to claim 1, wherein the information in the radiation includes an intensity distribution across said exit face.

3. An optical scanning device according to claim 1, wherein the device has an optical axis (OA) and said tilt misalignment includes a tilt misalignment about a first tilt axis (78) which is substantially perpendicular the optical axis, wherein said radiation detector arrangement includes a first detection area (90) and a second detection area (92) and said exit face includes a first exit face area (E) and a second exit face area (F), said first and second exit face areas being mutually displaced to opposite sides of said first tilt axis, wherein said first detection area is arranged to detect information indicative of an efficiency of evanescent coupling across said first exit face area and to produce a first detector signal ($\alpha_1$) representing the efficiency of evanescent coupling across the first exit face area, and wherein said second detection area is arranged to detect information indicative of an efficiency of evanescent coupling across said second exit face area and to produce a second detector signal ($\alpha_2$) representing the efficiency of evanescent coupling across the second exit face area.

4. An optical scanning device according to claim 3, wherein the radiation detector arrangement is arranged to produce a first tilt error signal ($\alpha$) according to the following relationship:

$$\alpha = \frac{\alpha_1 - \alpha_2}{\alpha_1 + \alpha_2}.$$

5. An optical scanning device according to claim 3, wherein said tilt misalignment includes a tilt about a second tilt axis (80) which is perpendicular the optical axis and the first tilt axis,
- wherein said radiation detector arrangement includes a third detection area (96) and a fourth detection area (98) and said exit face includes a third exit face area (G) and a fourth exit face area (H), said third and fourth exit face areas being mutually displaced to opposite sides of said second tilt axis
- wherein said third detection area is arranged to detect information indicative of an efficiency of evanescent coupling across said third exit face area and to produce a third detector signal ($\beta_1$) representing the efficiency of evanescent coupling across the third exit face area, and
- wherein said fourth detection area is arranged to detect information indicative of an efficiency of evanescent coupling across said fourth exit face area and to produce a fourth detector signal ($\beta_2$) representing the efficiency of evanescent coupling across the fourth exit face area.

6. An optical scanning device according to claim 5, wherein the radiation detector arrangement is arranged to produce a second tilt error signal ($\beta$) according to the following relationship:

$$\beta = \frac{\beta_1 - \beta_2}{\beta_1 + \beta_2}.$$

7. An optical scanning device according to claim 1, wherein the radiation detector arrangement includes a quadrant detector (66).

8. An optical scanning device according to claim 1, wherein the radiation generated by the radiation source system is a radiation beam and the device is arranged to introduce defocus into the radiation beam such that the radiation beam is not focused onto an information layer of the record carrier, thereby increasing a diameter of the spot at the exit face.

9. An optical scanning device according to claim 1, wherein the radiation generated by the radiation source system is a radiation beam and the device is arranged to introduce defocus into the radiation beam such that a cross-sectional area of the radiation beam at the exit face covers at least one quarter of a total area of the exit face.

10. An optical scanning device according to claim 1, wherein the device includes a tilt misalignment control system which is arranged to adjust the tilt misalignment in accordance with the tilt error signal.

11. An optical scanning device according to claim 10, wherein said tilt misalignment control system is arranged to adjust said tilt misalignment by adjusting a tilt of the objective system.

12. An optical scanning device according to claim 10, wherein said tilt misalignment control system is arranged to adjust said tilt misalignment by adjusting a tilt of the record carrier.

13. An optical scanning device according to claim 10 wherein said adjustment of the tilt misalignment is performed during a start-up procedure after a record carrier has been installed within the device to produce a corrected tilt misalignment, said corrected tilt misalignment being maintained, after start-up, and used when scanning the record carrier at different points across said record carrier.

14. An optical scanning device according to claim 10, wherein said adjustment of the tilt misalignment is performed after a record carrier has been installed within the device, wherein the tilt misalignment is adjusted when scanning the record carrier at different points across said record carrier.

15. An optical scanning device according to claim 1, wherein the information indicative of an efficiency of evanescent coupling is introduced into the radiation upon reflection of at least some of the radiation by the exit face of the objective system.

16. An optical scanning device according to claim 1, wherein the optical scanning device is arranged to scan the record carrier with radiation having a predetermined wavelength such that the gap between the exit face and the outer face approximately one tenth of the predetermined wavelength or less, across the exit face.

17. A method of scanning a record carrier (22) having an outer face (24), said method comprising scanning said record carrier using an optical scanning device, wherein the optical scanning device comprises:
- a) a radiation source system (2) arranged to generate radiation;
- b) an objective system (20) having an exit face (76), said objective system being arranged between said radiation source system and said record carrier and providing for evanescent coupling of the radiation across a gap between the exit face of the objective system and the outer face of the record carrier;
- c) a radiation detector arrangement for detecting radiation after interaction with the record carrier, the radiation detector arrangement being arranged to produce a tilt error signal ($\alpha$, $\beta$) representing a tilt misalignment between the exit face of the objective system and the outer face of the record carrier; and
- d) a tilt misalignment control system which is arranged to adjust the tilt misalignment between the exit face of the objective system and the outer face of the record carrier, wherein the method includes:
- irradiating said record carrier with said radiation generated by the radiation source system, wherein during said irradiation the radiation passes across the gap between the exit face of the objective system and the outer face of the record carrier by evanescent coupling;
- using said radiation detector arrangement to detect said radiation after interaction with the record carrier;
- using said radiation detector arrangement to produce a tilt error signal by detecting information in the detected radiation which is indicative of a variation in an efficiency of the evanescent coupling across the exit face; and
- using said tilt misalignment control system to adjust the tilt misalignment between the exit face of the objective system and the outer face of the record carrier, in accordance with the tilt error signal.

* * * * *